United States Patent
Link et al.

(10) Patent No.: US 11,983,028 B2
(45) Date of Patent: May 14, 2024

(54) ELECTRICAL POWER ENERGY CONVERTER UNIT FOR CONVERTING DIRECT CURRENT TO DIRECT CURRENT, DC-DC, WITH MAXIMUM POWER POINT TRACKING, MPPT, TO GET THE HIGHEST POSSIBLE EFFICIENCY

(71) Applicant: NEXPERIA B.V., Nijmegen (NL)

(72) Inventors: Omar Vince Link, Delft (NL); Weichen Xu, Delft (NL); Andre Rodrigues Mansano, Den Bosch (NL); Simon Van Der Jagt, Rotterdam (NL)

(73) Assignee: Nexperia B.V., Nijmegen (NL)

( * ) Notice: Subject to any disclaimer, the term of this patent is extended or adjusted under 35 U.S.C. 154(b) by 258 days.

(21) Appl. No.: 17/426,741

(22) PCT Filed: Jan. 30, 2020

(86) PCT No.: PCT/NL2020/050052
§ 371 (c)(1),
(2) Date: Jul. 29, 2021

(87) PCT Pub. No.: WO2020/159369
PCT Pub. Date: Aug. 6, 2020

(65) Prior Publication Data
US 2022/0100219 A1    Mar. 31, 2022

(30) Foreign Application Priority Data

Jan. 30, 2019  (NL) ...................... 1043138

(51) Int. Cl.
*G05F 1/67* (2006.01)
*H02J 3/38* (2006.01)

(52) U.S. Cl.
CPC ................ *G05F 1/67* (2013.01); *H02J 3/381* (2013.01); *H02J 2300/26* (2020.01)

(58) Field of Classification Search
CPC ..... G05F 1/67; H02J 3/38; H02J 3/381; H02J 2300/26; H02M 3/07
See application file for complete search history.

(56) References Cited

U.S. PATENT DOCUMENTS

| 9,154,032 | B1 | 10/2015 | Beijer | |
|---|---|---|---|---|
| 11,183,946 | B2 * | 11/2021 | Huynh | H02J 3/381 |
| 11,715,968 | B2 * | 8/2023 | Rodrigues Mansano | H02J 7/0068 307/23 |
| 2014/0232361 | A1 | 8/2014 | Dally | |
| 2018/0375433 | A1 | 12/2018 | Ahmed et al. | |

OTHER PUBLICATIONS

Esram, T. et al., "Comparison of Photovoltaic Array Maximum Power Point Tracking Techniques", IEEE Transactions on Energy Conversion, vol. 22, No. 2, Jun. 1, 2007, pp. 439-449.
(Continued)

*Primary Examiner* — Adolf D Berhane
(74) *Attorney, Agent, or Firm* — Ruggiero McAllister & McMahon LLC

(57) ABSTRACT

The invention relates to an electrical power energy converter unit for converting Direct Current to Direct Current, DC-DC, with maximum power point tracking that measures converted power at the output and controller module.

19 Claims, 3 Drawing Sheets

(56) References Cited

OTHER PUBLICATIONS

Gou, Wei et al., "Vibration Energy Harvesting System with MPPT for IoT Applications", 2018 1st Workshop on Wide Bandgap Power Devices and Applications in Asia, IEEE, May 16, 2018, pp. 320-323.
Niebauer, M. et al., "Solarenergie optimal nutzen, Intelligentes MPP-Tracking mit einem ST62-Mikrocontroller", Elektronik, WEKA Fachzeitschriften-Verlag GMBH, DE, vol. 45, No. 16, Aug. 6, 1996, pp. 86-89.
Shmilovitz, D., "On the control of photovoltaic maximum power point tracker via output parameters", IEEE Proceedings: Electric Power Applications, Institution of Electrical Engineers, GB, vol. 152, No. 2, Jan. 12, 2005, pp. 239-248.
International Search Report and Written Opinion dated May 7, 2020 for PCT/NL2020/050052.

* cited by examiner

From low-pass a buffer can be used. R1 and R2 can be replaced by switched capacitors network.

ELECTRICAL POWER ENERGY CONVERTER UNIT FOR CONVERTING DIRECT CURRENT TO DIRECT CURRENT, DC-DC, WITH MAXIMUM POWER POINT TRACKING, MPPT, TO GET THE HIGHEST POSSIBLE EFFICIENCY

TECHNICAL FIELD

The invention relates to an electrical power energy converter unit for converting Direct Current to Direct Current, DC-DC, with maximum power point tracking that measures converted output power and regulates electrical parameters with a controller module.

BACKGROUND

Prior solutions use electrical power energy converter unit for converting Direct Current to Direct Current with inductance and maximum power point tracking that regulates the electrical power energy converter input impedance based on input voltage measurements. The disadvantages of electrical power energy converter unit for converting Direct Current to Direct Current are the complexity of the design, footprint size of external components, such as an inductance, and sensitivity to pulsing control signals. The main drawback of the maximum power point tracking that regulates the electrical power energy converter unit input impedance based on input voltage measurements is that the efficiency of the electrical power energy converter unit is not taken into account during the tracking calculations. Some maximum power point tracking circuits regulate the electrical power energy converter unit input impedance based on output voltage measurement, however, this method highly depends on the amount of capacitance connected at the output of the electrical power energy converter unit.

SUMMARY

In view of the above mentioned disadvantages, it is an object of this invention to provide an improved electrical power energy converter unit for converting Direct Current to Direct Current, based on switched capacitance techniques, including maximum power point tracking that measures converted power at the output of the electrical power energy converter unit and controller module.

It is a further object of the invention to provide such an electrical power energy converter with improved energy efficiency in which the energy consumed by the control of the maximum power point tracking is, as compared to known electrical power energy converter units, reduced.

According to a first aspect of the invention, there is provided an electrical power energy converter unit that includes a power detector. The switched capacitor electrical power energy converter unit for converting Direct Current to Direct Current allows for large scale integration of devices and very small assembly size. Moreover, the power detector of included in the invention allows the use of high capacity energy storage since it measures output current flow instead of voltage.

In an embodiment, the output current of the switched capacitor electrical power energy converter unit is driven through a resistor, which can be a programmed, thus producing a voltage drop said first and second potential difference across the resistor. Furthermore, the voltage drop across the resistor is amplified by a voltage amplifier and sampled by sample-and-hold comparator. The sample-and-hold reads the amplified voltage drop and compares two samples. The sample-and-hold comparator output goes to a state-machine that decides if the electrical power energy converter unit parameters has to be changed to increase output power. The parameters are changed through a controller module that controls the switching frequency and voltage gain of the electrical power energy converter unit.

In energy harvesting systems, such as an RF energy harvesting modules but also in PV based energy harvesting modules, very low energy levels are captured from the energy source. Therefore, extremely efficient power management controls are needed for converting the electrical power energy from the energy harvesting source to the load, for example an internet-of-things sensor. Known maximum power point trackers typically use dedicated microcontrollers for measuring the maximum power point. These microcontrollers consume such amounts of energy, which, as compared to the application of energy harvesters, e.g. RF based, makes them not very efficient and suitable for such applications.

In an embodiment, the electrical power energy converter unit comprising a DC-DC converting module, controller module and maximum power point tracking module, is fully integrated as a System-on-a-Chip, SoC. This enables a high-power efficient design and sub-microwatt power consumption of the electrical power energy converter. No additional power inefficient microcontroller is required for measuring the maximum power point of power source connected to the input of the DC-DC converting module.

In an embodiment, the electrical power energy converter unit is arranged for subsequently turning on and off the maximum power point tracking module.

In an embodiment, the electrical power energy converter unit is arranged for subsequently turning on and off the current to said resistor.

In an embodiment, the electrical power energy converter unit is arranged for simultaneously turning on and off the maximum power point tracking module and the current to said resistor.

In another embodiment, the electrical power energy converter unit is arranged for power gating of the maximum power point tracking module components, such as the maximum power point tracking module itself and preferably also the resistor. This is achieved by subsequently disabling and enabling power point tracking module and/or but preferably simultaneously, the current through the resistor, in order to reduce power consumption. Disabling the maximum power point tracking can thus for example be achieved by bypassing the current to the resistor connected in series with the electrical output of the DC-DC converting module, directly from the output of the DC-DC converting module to the load. Disabling the maximum power point tracking can thus also be achieved by disabling the maximum power point tracking module itself. Most preferably, both are disabled at the same time with simultaneous on and off timings and timing intervals. Hence, in a most preferred embodiment, the State machine turns off the maximum power point tracking and shorts/programs the sensor resistors to guarantee low power operation.

Preferably, the resistor is one of an adjustable or programmable resistor. In another example, maximum power point tracking can be disabled by adjusting or programming the resistor with zero-value.

In an example at least one state machine, preferably a synchronous state machine, is arranged for power gating the maximum power point module. The at least one state machine can be comprised in the maximum power point tracking module or in the controller module.

With any of the embodiments which at least for some period of time disable current flowing through the resistor, a discontinuous measurement is obtained. As compared to known solutions, which are typically based on continuous measurement, the maximum power point tracking module of any of these aspects or embodiments achieves an improved power consumption efficiency.

With the power gating of the maximum power point tracking module, sub-microwatt power consumption of the electrical power energy converter unit is achieved. Power gating assures no power is dissipated in the resistor while converting energy.

The duty cycle of the power gating can be varied. For efficient power consumption the timeslot in which maximum power tracking is enabled is small and the timeslot in which maximum power tracking is disabled is large, preferably with a duty cycle of 10%, more preferably less than 5%. In other words, the ratio between the on and off time of the maximum power point tracking module or at least the current flowing through the resistor, is at least 1:2 but more preferably 1:4, 1:8, 1:10, 1:20 or even higher. More preferably, the ratio is dynamic and can change over time.

With this duty cycle, sub-microwatt power consumption during energy conversion is achieved while the maximum power point tracker is not enabled continuously. The decision for the maximum power point is made during a small timeslot, which is preferably no longer than 1 second. In yet another embodiment, the electrical power energy converter unit is arranged for detecting if no power is delivered to the output of the DC-DC converting module, for example due to an outage, and for stopping energy conversion. Preferably this is done by the at least one state machine.

BRIEF DESCRIPTION OF THE DRAWINGS

The invention will now be described in a non-limiting way with reference to the accompanying drawings in which like parts are indicated by like reference symbols and in which.

DETAILED DESCRIPTION

Figure 1:
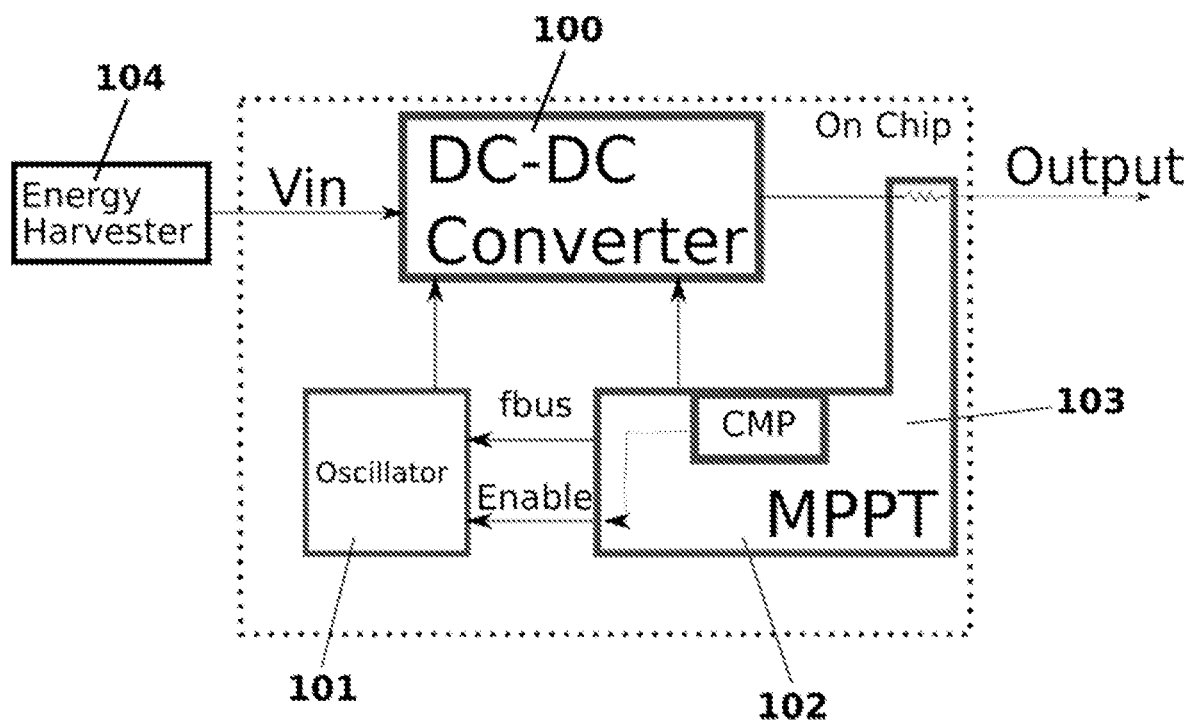
FIG. 1 High level block diagram of the invention.

FIG. 1 depicts the block diagram of an electrical power energy converter unit for energy harvesting application consisted of a DC-DC converting module (100), maximum power point tracking (102), sample-and-hold comparator (103), oscillator/controller module (101) and energy harvester transducer (104).

The DC-DC converting module (100) converts the energy provided by 104. The electrical parameters, such as impedance and power, of 104 change over time due to weather conditions, line of sight or mobility conditions. Therefore, a control loop is necessary to adapt the electrical parameters of the DC-DC converting module to the electrical parameters of 104.

The impedance of 100 is controlled by the maximum power point tracking and the oscillator-controller module (101). In 102, the output current of the DC-DC converting module is converted to voltage that is sampled in the sample-and-hold comparator (103). Furthermore, two sampled voltages, in sequence, are compared in 103 and sample-and-hold comparator outputs a digital signal that is read by a state-machine built in 102. The state machine reads the comparator signal and sets the control bits of the DC-DC converting module 100 and the oscillator/controller module 101.

The control bits are intended to adjust the voltage gain of the DC-DC converting module 100 and the switching frequency defined by the oscillator/controller module 101 and as consequence adjust the electrical parameters of the DC-DC converting module.

Figure 2:
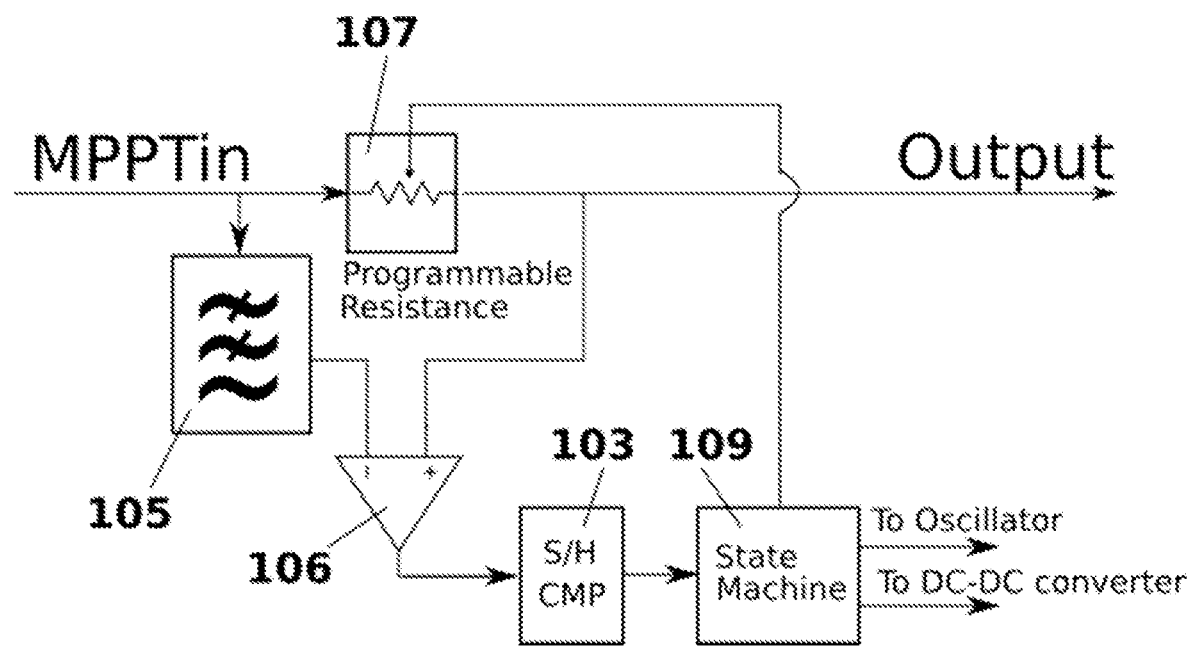
FIG. 2 Block diagram of the Maximum Power Point Tracking.

FIG. 2 shows the block diagram of the maximum power point tracking 102 that is consisted of a low-pass filter (105), a voltage amplifier (106), programmable resistor (107), sample-and-hold comparator (103) and state-machine (109). The DC-DC converting module output current flows through resistor 107 that has first terminal connected to the low-pass filter 105 and second terminal connected to the output. The low-pass filter 105 allows to convert the average output current into DC voltage that is amplified by the voltage amplifier 106. Afterwards, the sample-and-hold comparator 103 samples the amplified voltage and it compares with a voltage that has been sampled previously. After comparison, sample-and-hold comparator 103 outputs a logic signal that is read by the state-machine 109, which decides whether to increase or decrease the bit count of the oscillator/controller module and the bit count of the DC-DC converting module gain.

Figure 3:
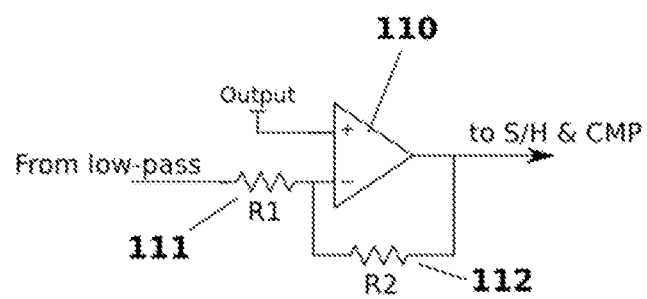
FIG. 3 Embodiment 1 of a voltage amplifier.

FIG. 3 presents one embodiment of the voltage amplifier 106. The voltage amplifier 106 is consisted of an operational amplifier (110), input resistor (111) and a feedback resistor (112). The voltage gain of the voltage amplifier 106 is defined by the ratio between the feedback resistor 112 and input resistor 111.

As a second embodiment the circuit from FIG. 3 can be implemented using a buffer to drive the input resistor 111. Furthermore, the input resistor 111 and feedback resistor 112 can be replaced by a switched capacitor network consisted of an input capacitance and a feedback capacitance and the gain is set by the capacitance ratio.

Figure 4:
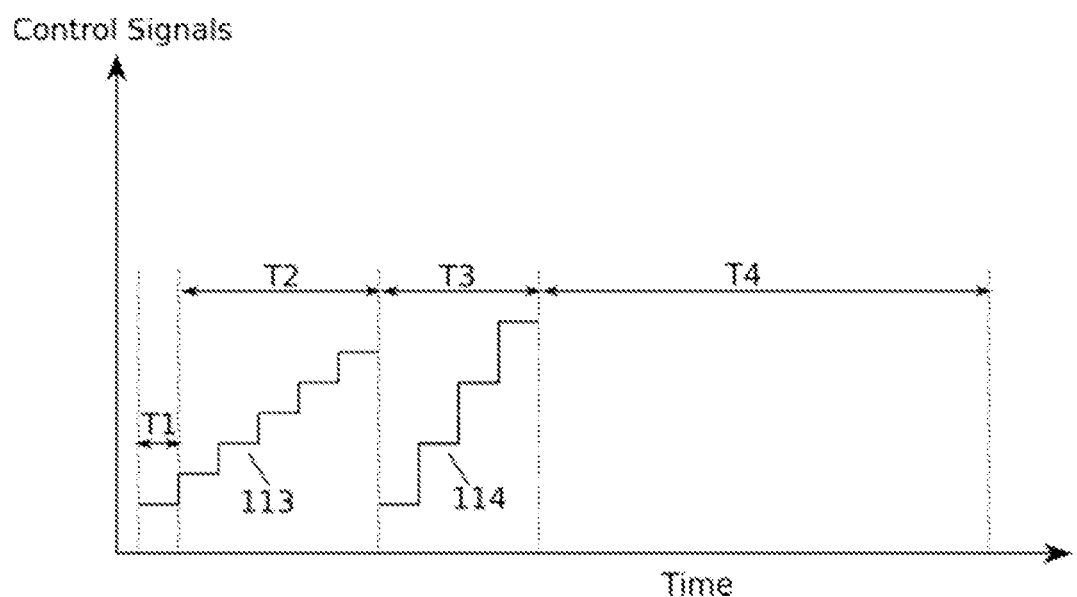
FIG. 4 Time diagram of the Maximum Power Point Tracking operation.

FIG. 4 shows the time diagram of the maximum power point tracking as an example of algorithm embodiment. The control signal 113 is varied with time duration T1 said settling interval and the control signal 113 is varied during T2 seconds said sweep interval. The control signal 113 defines the frequency parameter of the DC-DC converting module (100). Consecutively, the control signal 114 is swept during T3 seconds said fine tune interval. The control signals 113 and 114 are considered at the optimum value when the maximum power point is detected at the output of the DC-DC converting module. The time duration T4 is the time when maximum power point tracking is turned off said sleep interval. Typically the sleep interval T4 is much longer than said active interval, which is the sum of T1, T2 and T3, to reduce average power consumption of the maximum power point tracking and increase system efficiency. The settling interval T1 is constant, on the other hand the sweep interval T2 and fine tune interval T3 can vary with the number of steps that are needed to find the maximum power point of the DC-DC converting module.

The invention claimed is:
1. An electrical power energy converter unit for converting Direct Current to Direct Current (DC-DC), comprising:
  a DC-DC converting module operable for connecting with
    an energy harvesting module, supplying an electrical input for the DC-DC converting module, and outputting an electrical output for connecting a load;

a controller module operable for electrically controlling the DC-DC converting module and controlling electrical parameters thereof, wherein the electrical parameters comprise at least an input impedance of the DC-DC converting module; and a maximum power point tracking module, coupled with the controller module, operable for outputting a power point control signal to the controller module for adjusting at least one of the electrical parameters, wherein the maximum power point tracking module comprises a resistor connected in series with the electrical output for connecting the load of the DC-DC converting module and providing the power point control signal to the controller module upon a comparison between a first and second voltage potential sample over the resistor, and wherein the first and second voltage potential are sampled sequentially in time.

2. The electrical power energy converter unit according to claim 1, wherein the electrical power energy converter unit is operable for subsequently turning on and off the maximum power point tracking module.

3. The electrical power energy converter unit according to claim 1, wherein the electrical power energy converter unit is operable for subsequently turning on and off the current to the resistor.

4. The electrical power energy converter unit according to claim 2, wherein the electrical power energy converter unit is operable for simultaneously turning on and off the maximum power point tracking module and the current to the resistor.

5. The electrical power energy converter unit according to claim 3, wherein the maximum power point tracking module further comprises a bypass circuit for bypassing the resistor wherein current to the resistor is turned off.

6. The electrical power energy converter unit according to claim 1, further comprising a duty cycle of turning one or more of the current to the resistor on and off, and turning the maximum power point tracking module on and off, that is at most 50%.

7. The electrical power energy converter unit according to claim 1, wherein the output current of the DC-DC converting module is measured by determining the first and second voltage potential sample over the resistor.

8. The electrical power energy converter unit according to claim 1, wherein the DC-DC converting module is a switched capacitor DC-DC converter.

9. The electrical power energy converter unit according to claim 1, wherein the resistor is an adjustable resistor or a programmable resistor.

10. The electrical power energy converter unit according to claim 1, wherein the resistor is a fraction of the output resistance of the DC-DC converting module.

11. The electrical power energy converter unit according to claim 1, wherein the controller comprises an oscillator.

12. The electrical power energy converter unit according to claim 1, wherein the electrical parameters further comprise one or more of voltage gain and switching frequency of the DC-DC converting module.

13. The electrical power energy converter unit according to claim 1, wherein the voltage drop between the first and second voltage potential is amplified by a voltage amplifier.

14. The electrical power energy converter unit according to claim 13, wherein the voltage amplifier is a switched capacitor amplifier.

15. The electrical power energy converter unit according to claim 14, wherein the maximum power point tracking module further comprises a low-pass filter for smoothing at least one of the first and second voltage potential signal.

16. The electrical power energy converter unit according to claim 1, wherein the maximum power point tracking module further comprises a sample-and-hold comparator for sequentially sampling the first and second voltage potential in time.

17. The electrical power energy converter unit according to claim 1, wherein the maximum power point tracking module further comprises a state machine for determining that one or more of the electrical parameters have to be changed.

18. The electrical power energy converter unit according to claim 17, wherein the state machine determines to adapt the bit count of one or both of the controller module and the DC-DC converting module.

19. A System-on-a-Chip (SoC) comprising the electrical power energy converter unit according to claim 1.

* * * * *